(12) United States Patent
Schmit et al.

(10) Patent No.: US 8,894,802 B2
(45) Date of Patent: Nov. 25, 2014

(54) METHOD FOR PRODUCING COMPOSITE ELEMENTS

(75) Inventors: Ansgar Schmit, Osnabrueck (DE);
Rainer Hensiek, Melle (DE); Onno Graalmann, Bad Essen (DE); Simon Gramlich, Stuttgart (DE)

(73) Assignee: BASF SE, Ludwigshafen (DE)

( * ) Notice: Subject to any disclaimer, the term of this patent is extended or adjusted under 35 U.S.C. 154(b) by 607 days.

(21) Appl. No.: 13/131,270

(22) PCT Filed: Nov. 20, 2009

(86) PCT No.: PCT/EP2009/065536
§ 371 (c)(1),
(2), (4) Date: May 26, 2011

(87) PCT Pub. No.: WO2010/060864
PCT Pub. Date: Jun. 3, 2010

(65) Prior Publication Data
US 2011/0226417 A1 Sep. 22, 2011

(30) Foreign Application Priority Data
Nov. 28, 2008 (EP) .................... 08170227

(51) Int. Cl.
*B29C 65/00* (2006.01)
*B31B 1/60* (2006.01)
(Continued)

(52) U.S. Cl.
CPC .......... *B32B 37/1284* (2013.01); *B32B 15/043* (2013.01); *C09J 175/04* (2013.01);

(Continued)

(58) Field of Classification Search
USPC ........................ 156/60, 331.7, 349
See application file for complete search history.

(56) References Cited

U.S. PATENT DOCUMENTS 2,220,275 A 11/1940 Prestion et al.
2008/0223518 A1 9/2008 Gleinig et al.
(Continued)

FOREIGN PATENT DOCUMENTS

EP 1 516 720 3/2005
EP 1 593 438 11/2005
(Continued)

OTHER PUBLICATIONS

International Search Report Issued Jun. 8, 2010 in PCT/EP09/065536 filed Nov. 20, 2009.

*Primary Examiner* — Michael Orlando
(74) *Attorney, Agent, or Firm* — Oblon, Spivak, McClelland, Maier & Neustadt, L.L.P.

(57) ABSTRACT

The invention relates to a method for the production of composite elements comprising at least one outer layer a) and a layer b) firmly bonded to it, an adhesion promoter c) being applied between the outer layer a) and the layer b) firmly bonded to it, the outer layer a) being continuously moved and the adhesion promoter c) and the layer b) firmly bonded to it or the starting materials thereof being applied in succession to the outer layer, the application of the adhesion promoter c) being effected by means of a rotating disk which is mounted horizontally or with a slight deviation from the horizontal of up to 15°, wherein the rotating disk is provided with teeth on the edge.

20 Claims, 2 Drawing Sheets

(51) Int. Cl.
  *B32B 37/00*   (2006.01)
  *C09J 4/00*    (2006.01)
  *C09J 101/00*  (2006.01)
  *C09J 201/00*  (2006.01)
  *G05G 15/00*   (2006.01)
  *B32B 37/12*   (2006.01)
  *B32B 15/04*   (2006.01)
  *C09J 175/04*  (2006.01)
  *B05B 3/10*    (2006.01)
  *B32B 37/20*   (2006.01)

(52) U.S. Cl.
  CPC ............. *B05B 3/1014* (2013.01); *B32B 37/203* (2013.01); *B32B 2305/022* (2013.01); *B32B 2309/02* (2013.01); *B32B 2311/00* (2013.01); *B32B 2317/16* (2013.01); *B32B 2375/00* (2013.01); *B32B 2607/00* (2013.01)

USPC .......................... 156/331.7; 156/60; 156/349

(56) References Cited

U.S. PATENT DOCUMENTS

2010/0080900 A1   4/2010   Geraedts et al.
2011/0003082 A1   1/2011   Schoen et al.

FOREIGN PATENT DOCUMENTS

| GB | 2 201 907 | 9/1988 |
|----|-----------|--------|
| SU | 1219153   | 3/1986 |
| WO | 2006 029786 | 3/2006 |
| WO | 2006 120234 | 11/2006 |
| WO | 2007 093538 | 8/2007 |
| WO | WO 2008/104492 A2 | 9/2008 |
| WO | WO 2009/077490 A2 | 6/2009 |

METHOD FOR PRODUCING COMPOSITE ELEMENTS

This application is a National Stage of PCT/EP09/065536 filed Nov. 20, 2009 and claims the benefit of EP 08170227.6 filed Nov. 28, 2008.

The invention relates to a method for the production of composite elements.

Composite elements in the context of the present invention are sheet-like structures consisting of at least one outer layer and a layer firmly bonded to it.

An example of such composite elements are those having a core of polyurethane or polyisocyanurate foam and outer layers of metal, as described, for example, in EP 1 516 720. These composite elements are frequently also referred to as sandwich elements. Composite elements comprising at least one outer layer and a prefabricated core comprising a heat insulation material, for example mineral wool or an organic insulation material, such as plastic foam, for example polyurethane foam or polystyrene foam, as described, for example, in WO 2006/120234, are a further example. So-called light-weight building boards consisting of two outer layers, preferably of wood, plywood, particle boards, metal or plastic, and a core layer, preferably honeycomb structures or structures formed by folding or insertion, preferably comprising board, as described, for example, in WO 2007/093538, are further examples. In the widest sense, the composite elements may also be compact boards, such as wood boards or particle boards, which are coated with outer layers comprising plastic, veneer or metal.

In the production of the composite elements, it is necessary to produce a firm bond between the core material and the outer layers. In the case of composite elements having a prefabricated core, this is usually effected by means of an adhesive. In the case of sandwich elements, in principle firm adhesive bonding between the foam and the outer layers is effected. Nevertheless, surface defects of the foam, including detachment thereof from the outer layer, may occur. It is therefore advantageous to apply an adhesion promoter between the outer layer and the core, as described in EP 1516720.

There are various possibilities for applying the adhesives or adhesion promoters. A particularly advantageous method of application is that by means of a rotating disk. In the case of this method of application, a uniform coat can be produced without aerosols forming.

WO 2006/29786 describes a method for the production of sandwich elements, in which the adhesion promoter is applied by means of a rotating disk. The disk may be flat and preferably oval or star-shaped. In a further configuration of the disk, it has a cascade-like configuration and is provided with openings for discharge of the adhesion promoter.

EP 1593438 describes an apparatus for the production of sandwich elements, in which an adhesion promoter is applied to the outer layer by means of a rotating plate in which at least one opening is present.

WO 2006/120234 describes a method for the production of composite elements, in which a core is adhesively bonded on an outer layer. The application of the adhesive is likewise effected by means of a rotating disk, as described in EP 1516720.

WO 2007/0936538 describes a method for the production of light-weight building boards, in which the adhesive is likewise applied by means of a rotating disk, as described in WO 2006/29786.

However, the disks described also have disadvantages. It was found that the adhesion promoter or the adhesive must cure very rapidly in order to be able to have an optimum effect. As a result of this rapid reaction of the material, reacted material builds up rapidly on the disk. Consequently, the behavior in the case of the known disks is adversely affected. Thus, the holes in the disk become blocked after only a short time and the material is thrown over the disk edge in an uncontrolled manner. As a result, the distribution becomes nonuniform, in particular more material is thrown into the edge regions. Drop formation then no longer takes place only according to the principle of the disintegration of laminar liquid threads but also by detachment of individual drops or even disintegration of lamellae. The two last-mentioned disintegration mechanisms lead to considerably broader drop-size spectra. The dropsize is therefore no longer defined. In order to have an optimally operating disk, the disk has to be changed after only 20 minutes, depending on the speed of the adhesive. This would cause a stoppage of the plant.

Moreover, it is scarcely possible with the current disks to use adhesives or adhesion promoters which comprise solid fillers.

It was the object of the present invention to provide rotating disks for applying adhesive or adhesion promoter to outer layers/lower surfaces, which ensure uniform application even over a long time, referred to below as service life, by means of which even adhesives comprising solid fillers can be applied.

The object could surprisingly be achieved by the use of a disk which is provided with teeth on the edge.

Figure 1:
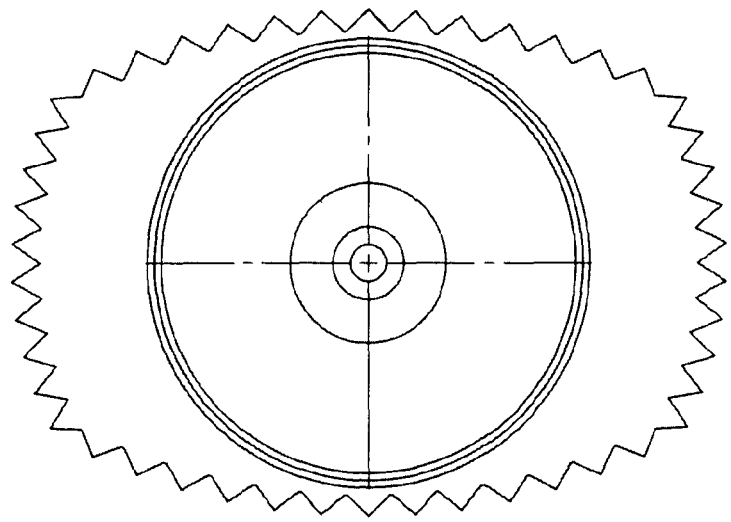
FIG. 1 shows a disk of the present invention.

The invention accordingly relates to a method for the production of composite elements consisting of at least one outer layer a) and one or more layers b) firmly bonded to it, an adhesive c), also referred to below as adhesion promoter, being applied by means of a rotating disk between the outer layer and the layer bonded to it, wherein the rotating disk is provided with teeth on the edge.

The invention furthermore relates to an apparatus for the production of composite elements comprising at least one outer layer a) and a layer b) firmly bonded to it, an adhesion promoter c) being applied between the outer layer a) and the layer b) firmly bonded to it, the outer layer a) being continuously moved and the adhesion promoter c) and the layer b) firmly bonded to it or the starting materials thereof being applied in succession to the outer layer, the application of the adhesion promoter c) being effected by means of a rotating disk, wherein the rotating disk is provided with teeth on the edge.

In a particularly preferred embodiment of the invention, the disk has an elevated edge. The teeth are mounted on this edge.

Width, number and taper angle of the teeth are tailored to one another so that the adhesive can be applied to the outer layer/lower surface underneath in as uniform and finely divided a manner as possible.

The teeth may be triangular or tetragonal and may have a width of 0.5-40 mm and a length of 0.1 to 50 mm. The teeth may all have the same geometry or may have different geometries and sizes. The teeth may be mounted horizontally or in an upward or downward direction at an angle up to 90°.

In a preferred embodiment of the invention, the teeth taper to a point. However, it is also possible for the teeth to have rounded tips. In a further embodiment of the invention, the teeth are rectangular or trapezoidal. It is important that, on contact with liquid, liquid threads form at the teeth, the disintegration of which threads into drops is controllable and leads to drop size spectra having a narrow distribution.

The elevated edge can ascend at angles of greater than 0 to 150° relative to the disk. An ascent of from 80° to 100° is preferred. The edge serves for ensuring uniform film flow over the disk. The transition to the elevated edge can be angular or rounded.

The number of teeth is dependent, inter alia, on the desired distribution of the liquid over the outer layer and the material properties of the adhesive, such as density, viscosity and surface tension. Preferably, the disk has at least 4 and not more than 600, preferably 20-80, in particular 40-60, teeth.

The basic shape of the disk is preferably circular. It is also possible to design the disk to be oval or star-shaped. It is also possible to use a geometry which describes the inner four lines of three intersecting circles which are arranged as follows. The inner circle has its midpoint on the axis of rotation. The other two circles having a larger diameter have their midpoint on a straight line which passes through the axis of rotation and whose radius is greater than the distance between the midpoint of the circle and the axis of rotation and at most so large that the smaller circle is just intersected. The edge at the elevated ejection region is circular and serves for ensuring uniform flow. The diameter of this circle can be chosen to be as large as possible.

Figure 2:
FIG. 2 shows a sectional view of a disk having an elevated edge.
Figure 3:
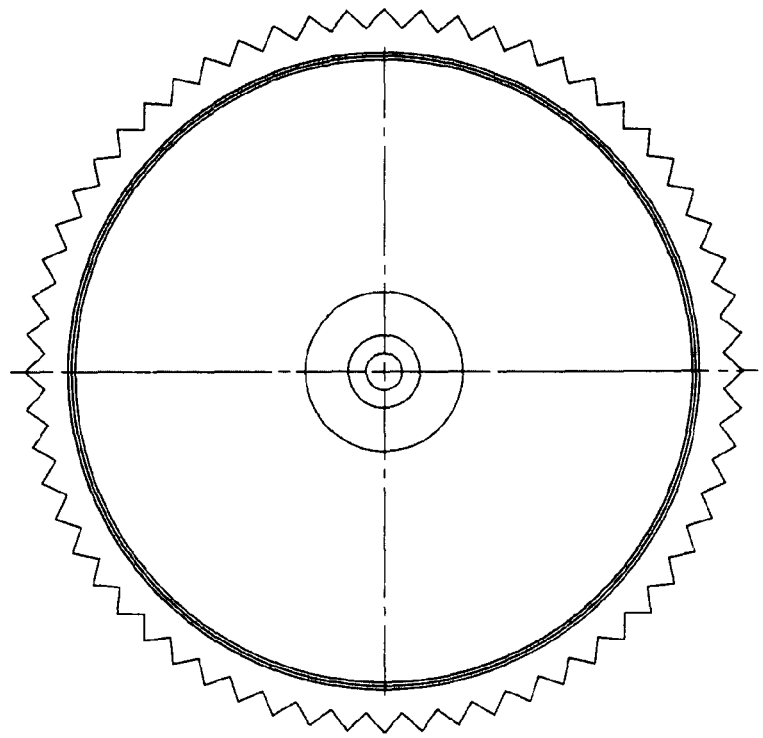
FIG. 3 shows a disk having an elevated edge.

Such a disk is shown in FIGS. 1-3.

Figure 4:
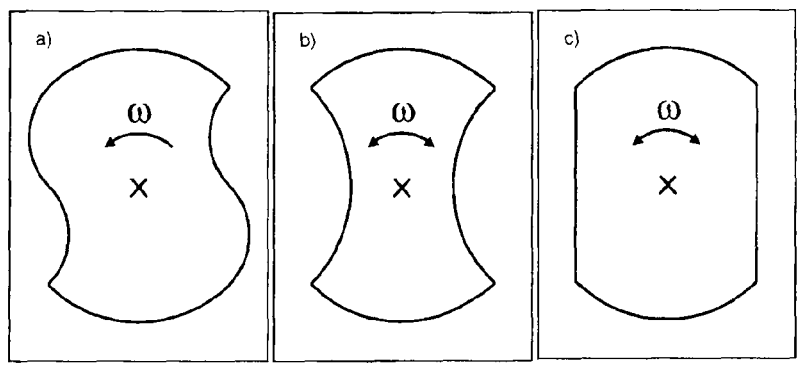
FIG. 4 shows additional geometries of a disk of the present invention. The disk of S-shaped design (FIG. 4a) or a disk with a concave (FIG. 4b) or a straight (FIG. 4c) base shape may be employed.

FIG. 4 shows further geometries of the disk according to the invention.

Thus disks of S-shaped design (FIG. 4a) or disks with a concave (FIG. 4b) or straight (FIG. 4c) base shape may be employed. The arrow labeled with the symbol ω in the figure indicates the possible direction of rotation of each disk.

It is important here that the contour is not too much different from a circle, since otherwise the adhesive c), particularly at the cut edges of the contour lines, does not form a jet via each tooth; instead, a plurality of jets merge, leading then to an untidy application behavior.

The S-shaped design allows a relatively large indentation (deviation from the circular shape), since the critical points at which jet convergence may occur are rounded. For this reason, however, this design can be operated only in one direction of rotation.

A further embodiment may be a bell in which the material is transported along the underside of the apparatus to the atomizer edge. The following embodiments apply both to disks and to bells.

The length ratio of the diameter of the disk to the elevated edge is preferably from 5/1 to 100/1, preferably about 20/1.

Depending on the width of the outer layer, also referred to as band width, the disk has a diameter from 0.05 to 0.4 m, preferably from 0.1 to 0.3 m, particularly preferably 0.12-0.25 m, in the case of oval disks, based on the long side of the oval shape. The ratio of the diameter of the disk to the band width is 0.05-0.35.

The disk is preferably mounted at a height of 0.01-0.3 m, preferably 0.03-0.18 m, particularly preferably 0.03-0.15 m, above the outer layer to be wetted.

The rotating disk is mounted horizontally or with a slight deviation from the horizontal of up to 15°, relative to the outer layer.

The wetting radius of the adhesion promoter on the lower outer layer is preferably 0.05-1.5 m, preferably 0.35-1.20 m. In the case of relatively broad outer layers, it is possible to use two or more disks which can be arranged side by side or offset.

The rotational speed of the disk is preferably 200-2500 $min^{-1}$, particularly preferably 200-2000 $min^{-1}$, and in particular 600-1200 $min^{-1}$. A possibility for ensuring uniform application is by oscillation of the rotational speed. In this procedure, the rotational speed is periodically briefly reduced and increased again to the initial level. As a result of the brief reduction, the throwing distance decreases and leads to a uniform coating pattern. The reduction may be up to 10% of the original rotational speed, preferably from 50% to 80%.

The mass flow to be distributed is 10 g/min-5 kg/min, preferably 200 g/min-2 kg/min, particularly preferably 400 g/min-1.8 kg/min.

In a particular embodiment of the invention, at least two, at most 5, particularly preferably two, disks are arranged one on top of the other. The diameter of the upper disk is preferably greater than the diameter of the lower disk, preferably in a ratio of upper to lower disk of 1/0.8-1/10, preferably 3/5. At least the upper disk is equipped with teeth and preferably all disks are equipped with teeth. All abovementioned shapes can be combined. It is also possible to use a component consisting of a disk geometry on the top and a bell geometry on the underside.

The advantage of using a plurality of disks is that the coat distribution is more uniform.

In the case of disks arranged one on top of the other, the adhesive is preferably applied to each disk individually. A concentric gap should be provided in the case of the upper disks as an opening for charging the lower disks. The internal radius of the gap corresponds to the shaft diameter. The ratio of the external radius of the gap to the external radius of the corresponding disk is not more than 0.98, preferably from 0.2 to 0.5. However, it is also possible to charge only one disk and to effect the distribution onto the other disks by suitable internals, such as bores or guide channels. The number of holes or guide channels is 4-12, preferably 4-8, particularly preferably 4. The openings each have a cross-sectional area of 25-900 $mm^2$, preferably 100-650 $mm^2$, particularly preferably 100-400 $mm^2$. In the case of bells, the material is applied to the top and transported to the underside by guide channels described above.

The disk may be produced from all materials which are inert to the adhesion promoter. Metals or plastics are preferred. The disks are preferably produced from plastics. Thermoplastics, such as polyolefins, polystyrene, polyamide, Teflon or polyacetals, such as polyoxymethylene (POM), are particularly preferred here.

Wood boards, sandwich-type plasterboards, glass tiles, aluminum foils, aluminum, copper or steel sheets, preferably aluminum foils, aluminum or steel sheets, particularly preferably steel sheets, can be used as the outer layer a). The steel sheets may be coated or uncoated. Preferably, they are not corona-treated.

In the production of light-weight building boards, wood boards or particle boards can be used as outer layers a) and honeycomb bodies, for example comprising wood or board, as layers b).

In the production of insulation boards, those comprising insulation materials such as mineral wool, foamed polystyrene or isocyanate-based rigid foam, also referred to as rigid polyurethane foam, can be used as layers b) firmly bonded to the outer layer a). The isocyanate-based rigid foam can also be modified with isocyanurate groups.

With the use of isocyanate-based rigid foam as layer b), the production of the composite elements is in general effected continuously. The liquid starting components of the rigid foam are applied to the outer layer a), where they cure to give the foam.

With the use of metal sheets or foils as outer layers, which is usual here, these are uncoiled in succession from a roll, profiled, heated, optionally corona-treated in order to increase the foamability with polyurethane, foamed with the starting material for the isocyanate-based rigid foam b), also frequently referred to as PU or PIR system, cured in the double-belt unit and finally cut to the desired length.

The outer layer is preferably transported at a constant speed of 2-25 m/min, particularly preferably 2-15 m/min and in particular 3-12 m/min, particularly preferably 3-9 m/min. The outer layer is in a horizontal position at least from the application of the PU system b), preferably during the total duration from the application of the adhesion promoter. The adhesion promoter can also be applied if the outer layer is slightly inclined in the transport direction and thus not transported horizontally.

Customary one- or two-component adhesives can be used as adhesives in the production of light-weight building boards or insulation boards based on mineral wool or polystyrene.

In the continuous production of composite elements based on isocyanate-based rigid foam, adhesion promoters c) based on polyurethanes, in particular two-component systems, are preferably used.

The application of the adhesion promoter c) can be effected in principle at any point of the process between uncoiling of the outer layers and application of the PU or PIR system.

It is advantageous if the distance between application of the adhesion promoter c) and application of the PU or PIR system b) is small. As a result, the waste which this process produces at the beginning and end and during unforeseen interruptions of the production process is minimal.

In the case of the use of a two-component system, the adhesion promoter c) is mechanically mixed prior to application to the rotating disk, it being possible to use high-pressure or low-pressure mixers, preferably low-pressure mixers, and is applied to the disk via a suitable application apparatus, for example a downstream stirrer member. If the disk is now caused to rotate by means of a drive, extensive distribution of the adhesion promoter c) over the continuously transported outer layer present under the disk takes place. For mixing and application of the adhesion promoter to the disk, for example, a stirrer member comprising plastic can be used. The amount of adhesion promoter c) applied is tailored to the speed of the continuously operating double belt in such a way that the desired application amount per $m^2$ of metal sheet can be realized.

After application of the adhesion promoter c) to the lower outer layer is complete, the starting material for the isocyanate-based rigid foam b) is applied. The reactivity of the adhesion promoter c) is adjusted so that the systems b) and c) react with one another (the open time of the adhesion promoter c) at the time of application of b) has thus not yet been exceeded) and cure after a defined time.

By using the adhesion promoter c), the double belt temperature can be reduced to 55° C.

Adhesion promoters used may be the polyurethane-based adhesion promoters known from the prior art. These are generally obtainable by reacting polyisocyanates with compounds having two hydrogen atoms reactive toward isocyanates, the conversion ratio preferably being chosen so that the ratio of the number of isocyanate groups to the number of groups reactive toward isocyanates in the reaction mixture is from 0.8 to 1.8:1, preferably from 1 to 1.6:1.

Polyisocyanates used are the customary aliphatic, cycloaliphatic and in particular aromatic di- and/or polyisocyanates. Toluene diisocyanate (TDI), diphenylmethane diisocyanate (MDI) and in particular mixtures of diphenylmethane diisocyanate and polyphenylenepolymethylene polyisocyanates (crude MDI) are preferably used.

Preferably, the isocyanates of BASF SE Lupranat® M 50, Lupranat® M 70 and Lupranat® M 200, are used. In a particular embodiment, the isocyanates which are used for the preparation of the isocyanate-based rigid foam b) and of the adhesion promoter c) are identical. Lupranat® M 70 is used in a preferred embodiment, and Lupranat® M 200 is used in a particularly preferred embodiment.

Suitable compounds having at least two hydrogen atoms reactive toward isocyanate are in general those which carry two or more reactive groups selected from OH groups, SH groups, NH groups, $NH_2$ groups and CH-acidic groups, such as, for example, β-diketo groups, in the molecule.

Polyetherols and/or polyesterols are preferably used, particularly preferably polyetherpolyols. The hydroxyl number of the polyetherols and/or polyesterols used is preferably from 25 to 800 mg KOH/g, and the molecular weights are in general greater than 400. The polyurethanes can be prepared without or with chain extenders and/or crosslinking agents. Chain extenders and/or crosslinking agents used are in particular di- or trifunctional amines and alcohols, in particular diols and/or triols having molecular weights of less than 400, preferably from 60 to 300.

The polyol component of the adhesion promoter c) preferably has a viscosity of 100-1000 mPas, preferably 100-800 mPas, particularly preferably 150-400 mPas (25° C.).

The adhesion promoter can, optionally, comprise additive or reactive flameproofing agents. Such flameproofing agents are generally used in an amount of from 0.1 to 30% by weight, based on the total weight of the polyol component.

Preferably, no physical blowing agents are added to the reaction of the polyisocyanates with the polyols. However, the polyols used may still comprise residual water, which acts as a blowing agent. The resulting polyurethane adhesion promoters, as preferably employed in the case of the use of isocyanate-based rigid foams as layer b), thus have a density of from 200 to 1200 g/l, preferably from 400 to 1000 g/l, particularly preferably from 450 to 900 g/l.

The isocyanate-based rigid foams b) used for the method according to the invention are prepared in a customary and known manner by reacting polyisocyanates with compounds having at least two hydrogen atoms reactive with isocyanate groups, in the presence of blowing agents, catalysts and customary assistants and/or additives. Regarding the starting materials used, the following may be stated specifically.

Suitable organic polyisocyanates are preferably aromatic polyfunctional isocyanates.

Toluene 2,4- and 2,6-diisocyanate (TDI) and the corresponding isomer mixtures, diphenylmethane 4,4'-, 2,4'- and 2,2'-diisocyanate (MDI) and the corresponding isomer mixtures, mixtures of diphenylmethane 4,4'- and 2,4'-diisocyanates, polyphenylpolymethylene polyisocyanates, mixtures of diphenylmethane 4,4'-, 2,4'- and 2,2'-diisocyanates and polyphenylpolymethylene polyisocyanates (crude MDI) and mixtures of crude MDI and toluene diisocyanates may be mentioned specifically by way of example. The organic di- and polyisocyanates can be used individually or in the form of mixtures.

Frequently, so-called modified polyfunctional isocyanates, i.e. products which are obtained by chemical reaction of organic di- and/or polyisocyanates, are also used. Di- and/or polyisocyanates comprising isocyanurate and/or urethane groups may be mentioned by way of example. The modified polyisocyanates can, optionally, be mixed with one another or with unmodified organic polyisocyanates, such as, for example, diphenylmethane 2,4'-, 4,4'-diisocyanate, crude MDI, toluene 2,4- and/or 2,6-diisocyanate.

In addition, reaction products of polyfunctional isocyanates with polyfunctional polyols and mixtures thereof with other di- and polyisocyanates can also be used.

Crude MDI having an NCO content of from 29 to 33% by weight and a viscosity at 25° C. in the range of 150 to 1000 mPas has proven particularly useful as an organic polyisocyanate.

In particular, polyether alcohols and/or polyester alcohols having OH numbers in the range from 25 to 800 mg KOH/g are used as compounds b) having at least two hydrogen atoms reactive toward isocyanate groups.

The polyester alcohols used are generally prepared by condensation of polyfunctional alcohols, preferably diols, having 2 to 12 carbon atoms, preferably 2 to 6 carbon atoms, with polyfunctional carboxylic acids having 2 to 12 carbon atoms, for example succinic acid, glutaric acid, adipic acid, suberic acid, azelaic acid, sebacic acid, decanedicarboxylic acid, maleic acid, fumaric acid and preferably phthalic acid, isophthalic acid, terephthalic acid and the isomeric naphthalenedicarboxylic acids.

The polyesterols used generally have a functionality of 1.5-4.

In particular, polyetherpolyols which are prepared by known processes, for example by anionic polymerization of alkylene oxides with H-functional starter substances in the presence of catalysts, preferably alkali metal hydroxides, are used.

Alkyene oxides used are in general ethylene oxide and/or propylene oxide, preferably pure 1,2-propylene oxide.

Starter substances used are in particular compounds having at least 3, preferably from 4 to 8, hydroxyl groups or having at least two primary amino groups in the molecule.

Trimethylolpropane, glycerol, pentaerythritol, sugar compounds, such as, for example, glucose, sorbitol, mannitol and sucrose, polyfunctional phenols, resols, such as, for example, oligomeric condensates of phenol and formaldehyde and Mannich condensates of phenols, formaldehyde and dialkanolamines, and melamine are preferably used as starter substances having at least 3, preferably from 4 to 8 hydroxyl groups in the molecule.

Aromatic di- and/or polyamines, for example phenylenediamines, 2,3-, 2,4-, 3,4- and 2,6-toluenediamine and 4,4'-, 2,4'- and 2,2'-diaminodiphenylmethane, and aliphatic di- and polyamines, such as ethylenediamine, are preferably used as starter substances having at least two primary amino groups in the molecule.

The polyetherpolyols have a functionality of, preferably, from 3 to 8 and hydroxyl numbers of, preferably, from 25 mg KOH/g to 800 mg KOH/g and in particular from 240 mg KOH/g to 570 mg KOH/g.

The compounds having at least two hydrogen atoms reactive toward isocyanate also include chain extenders and crosslinking agents optionally concomitantly used. For modifying the mechanical properties, the addition of difunctional chain extenders, trifunctional and higher-functional crosslinking agents and, optionally, also mixtures thereof may prove advantageous. Alkanolamines and in particular diols and/or triols having molecular weights of less than 400, preferably from 60 to 300, are preferably used as chain extenders and/or crosslinking agents.

Chain extenders, crosslinking agents or mixtures thereof are expediently used in an amount of from 1 to 20% by weight, preferably from 2 to 5% by weight, based on the polyol component.

The preparation of the rigid foams is usually carried out in the presence of blowing agents, catalysts, flameproofing agents and cell stabilizers and, if required, further assistants and/or additives.

Water, which reacts with isocyanate groups with elimination of carbon dioxide, can be used as a blowing agent. In combination with or preferably instead of water, so-called physical blowing agents can also be used. These are compounds which are inert to the components used and are generally liquid at room temperature and vaporize under the conditions of the urethane reaction. The boiling point of these compounds is preferably below 50° C. The physical blowing agents also include compounds which are gaseous at room temperature and are introduced under pressure into the components used or dissolved in them, for example carbon dioxide, low-boiling alkanes and fluoroalkanes.

The compounds are generally selected from the group consisting of alkanes and/or cycloalkanes having at least 4 carbon atoms, dialkyl ethers, esters, ketones, acetals, fluoroalkanes having 1 to 8 carbon atoms and tetraalkylsilanes having 1 to 3 carbon atoms in the alkyl chain, in particular tetramethylsilane.

Propane, n-butane, isobutane and cyclobutane, n-pentane, isopentane and cyclopentane, cyclohexane, dimethyl ether, methyl ethyl ether, methyl butyl ether, methyl formate, acetone and fluoroalkanes which can be degraded in the troposphere and therefore do not harm the ozone layer, such as trifluoromethane, difluoromethane, 1,1,1,3,3-pentafluorobutane, 1,1,1,3,3-pentafluoropropane, 1,1,1,2-tetrafluoroethane, difluoroethane and heptafluoropropane, may be mentioned by way of example. Said physical blowing agents can be used alone or in any combination with one another.

The polyurethane or polyisocyanurate foams usually comprise flameproofing agents. Bromine-free flameproofing agents are preferably used. Flameproofing agents comprising phosphorus atoms are particularly preferred and in particular trischloroisopropyl phosphate, diethylethane phosphonate, triethyl phosphate and/or diphenyl cresyl phosphate are used.

Catalysts used are in particular compounds which greatly accelerate the reaction of the isocyanate groups with the groups reactive with isocyanate groups. Such catalysts are strongly basic amines, such as, for example, secondary aliphatic amines, imidazoles, amidines, and alkanolamines and/or organometallic compounds, in particular those based on tin.

If isocyanurate groups are to be incorporated into the rigid foam, special catalysts are required. Isocyanurate catalysts used are usually metal carboxylates, in particular potassium acetate and solutions thereof. The catalysts can be used alone or as any mixtures with one another, depending on requirements.

Assistants and/or additives which are used are the substances known per se for this purpose, for example surface-active substances, foam stabilizers, cell regulators, fillers, pigments, dyes, hydrolysis stabilizers, antistatic agents and fungistatic and bacteriostatic agents.

Further information about the starting materials, blowing agents, catalysts and assistants and/or additives used for carrying out the method according to the invention is to be found, for example, in Kunststoffhandbuch, volume 7, "Polyurethane", Carl-Hanser-Verlag Munich, $1^{st}$ edition, 1966, $2^{nd}$ edition, 1983 and $3^{rd}$ edition, 1993.

For the preparation of the isocyanate-based rigid foams, the polyisocyanates and the compounds having at least two hydrogen atoms reactive with isocyanate groups are reacted in amounts such that the isocyanate index in the case of the polyurethane foams is in the range from 100 to 220, preferably from 115 to 180. The rigid polyurethane foams can be prepared batchwise or continuously with the aid of known mixing apparatuses.

In the preparation of polyisocyanurate foams, it is also possible to work with an index of >180, preferably 200-500, particularly preferably 250-500.

The mixing of the starting components can be effected with the aid of known mixing apparatuses.

Usually, the rigid PU foams according to the invention are prepared by the two-component method. In this method, the compounds having at least two hydrogen atoms reactive toward isocyanate groups are mixed with the blowing agents, the catalysts and the further assistants and/or additives to give a so-called polyol component and this is reacted with the polyisocyanates or mixtures of the polyisocyanates and, optionally, blowing agents, also referred to as isocyanate component.

The starting components are generally mixed at a temperature of from 15 to 35° C., preferably from 20 to 30° C. The reaction mixture can be mixed by means of high-pressure or low-pressure metering machines.

The density of the rigid foams used for this purpose is preferably from 10 to 400 kg/m$^3$, preferably 20-200, in particular from 30 to 100 kg/m$^3$.

The thickness of the composite elements is usually in the range from 5 to 250 mm.

By means of the disk geometries according to the invention, it was possible substantially to lengthen the service life in spite of the buildup of reacted adhesive on the disk. Surprisingly, in spite of the material buildup on the disk, the distribution of the adhesive on the outer layer and the dropsize remain virtually unchanged. Surprisingly, the flight path of the drops spun off the disk also remains substantially constant. A further advantage is that the edge of the sprayed surface on the outer layer can be clearly defined in the case of the disk geometries according to the invention.

FIG. 2 shows the section through a disk having an elevated edge.

FIG. 3 shows the view onto a disk having an elevated edge.

The invention claimed is:

1. A method for the production of composite elements comprising at least one outer layer a) and a layer b) firmly bonded to the at least one outer layer a), the method comprising applying an adhesion promoter c) between the outer layer a) and the layer b), wherein the outer layer a) is continuously moved and the adhesion promoter c) and the layer b) or the starting materials thereof are applied in succession to the outer layer, wherein the adhesion promoter c) is applied with a rotating disk, wherein the rotating disk comprises from 20 to 80 teeth that taper to a point on the edge.

2. The method according to claim 1, wherein the disk has an elevated edge on which the teeth are mounted.

3. The method according to claim 1, wherein the teeth have a triangular shape.

4. The method according to claim 1, wherein the teeth have a tetragonal shape.

5. The method according to claim 1, wherein the teeth are mounted horizontally.

6. The method according to claim 2, wherein the length ratio of the diameter of the disk to elevated edge is from 5/1 to 100/1.

7. The method according to claim 2, wherein the transition to the elevated edge is angular.

8. The method according to claim 2, wherein the transition to the elevated edge is rounded.

9. The method according to claim 1, wherein at least two, at most 5, disks are arranged one on top of the other.

10. The method according to claim 1, wherein the disk is mounted at a height of 0.02-0.2 m above the outer layer a).

11. The method according to claim 1, wherein the wetting radius of the adhesion promoter c) on the outer layer a) is 0.25-1.5 m.

12. The method according to claim 1, wherein the rotational speed of the disk is 200-2500 min$^{-1}$.

13. The method according to claim 1, wherein the rotational speed is periodically briefly reduced and increased again to the initial level.

14. The method according to claim 1, wherein the adhesion promoter c) used is a reactive one-component or multicomponent polyurethane system.

15. The method according to claim 1, wherein the layer b) comprises an isocyanate-based rigid foam, and wherein the adhesion promoter c) has not yet exceeded its open time at the time of application of the starting material for the isocyanate-based rigid foam b) to the lower outer layer.

16. The method according to claim 1, wherein the adhesion promoter c) comprises no physical blowing agent.

17. The method according to claim 15, wherein the isocyanate-based rigid foams b) are polyurethane or polyisocyanurate foams.

18. The method according to claim 15, wherein the adhesion promoter c) has a gross density of 200-1200 g/l.

19. The method according to claim 1, wherein the outer layer is wood, a sandwich-type plasterboard, a glass tile, an aluminum foil, an aluminum sheet, a copper sheet, or a steel sheet.

20. The method according to claim 1, wherein the outer layer is an aluminum foil, an aluminum sheet, or a steel sheet.

* * * * *